L. T. JONES.
STUDS AND BEARINGS FOR SEWING-MACHINES &c.

No. 187,640. Patented Feb. 20, 1877.

WITNESSES
Villette Anderson
W. C. Mabi

INVENTOR
Levin T. Jones,
by O. W. Anderson,
ATTORNEY

UNITED STATES PATENT OFFICE.

LEVIN T. JONES, OF BALTIMORE, MARYLAND.

IMPROVEMENT IN STUDS AND BEARINGS FOR SEWING-MACHINES, &c.

Specification forming part of Letters Patent No. 187,640, dated February 20, 1877; application filed February 3, 1877.

*To all whom it may concern:*

Be it known that I, LEVIN T. JONES, of Baltimore, in the county of Baltimore and State of Maryland, have invented a new and valuable Improvement in Studs and Bearings for Sewing-Machines and other Purposes; and I do hereby declare that the following is a full, clear, and exact description of the construction and operation of the same, reference being had to the annexed drawings, making a part of this specification, and to the letters and figures of reference marked thereon.

Figure 1:
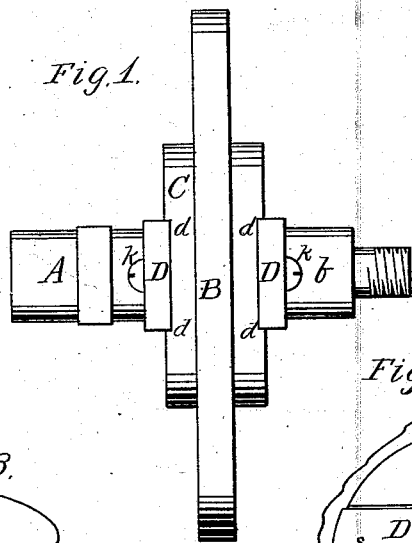
Figure 2:
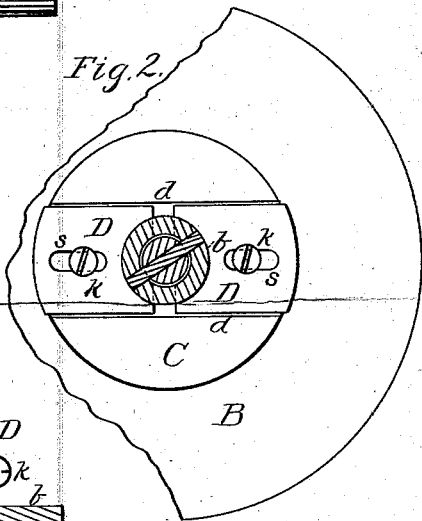
Figure 3:
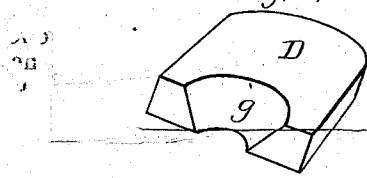
Figure 4:
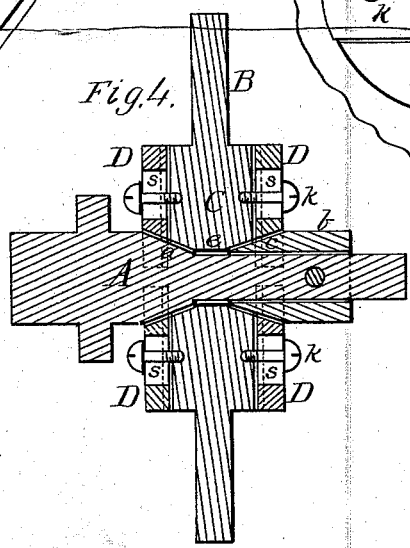

Figure 1 of the drawings is a representation of an edge view of this invention, showing the ends of the bearings. Fig. 2 is a side view of the same. Fig. 3 is a perspective view of one section of a bearing. Fig. 4 is a vertical section through the stud, wheel, and bearings.

This invention has relation to means for taking up the lost motion of the shafts or journals of pulleys and other rotating parts of machinery; and it consists in the construction and novel arrangement of a set of slotted bearings on each side of the journal or shaft, the bearings of each set being adjustable toward each other, and fixed in this adjustment by set-screws or other suitable fastenings, as hereinafter shown and described.

In the accompanying drawings I have illustrated this invention in its application to the journal or stud of a sewing-machine pulley.

The letter A represents the stud, having a conical shoulder, *a*, and a sleeve, *b*, having a conical end, *c*, said sleeve being designed to be riveted, or otherwise rigidly secured, to the stud after the hub of the pulley has been slipped thereon.

B indicates the pulley, having the hub C and eye *e*, through which the stud is designed to pass. On each side of said hub slideways or guides *d* are provided, extending on opposite sides of the eye parallel with each other. Between these guides are arranged, on opposite sides of the eye, two bearings, D, having concave ends *g*, which are nearly semicircular, and beveled to correspond with the conical shoulder *a* and sleeve end *c* of the stud. If the journal-shaft is cylindrical, these concave bearings may be nearly semi-cylindrical, sufficient space being left between the ends *g* for adjustment toward each other to compensate for wear.

In the body of each bearing, and parallel with the guides *d*, is a slot, *s*, through which passes a clamp-screw, K, by means of which the bearing is rigidly fixed in its adjustment.

There are two of these bearings on each side of the hub, diametrically opposite one another, so that there are four bearings to the pulley. All of these may be adjustable, as stated, or two of them may be cast solid with the wheel and two made adjustable.

The operation is apparent. As the bearing-surfaces are worn away the bearings are set up toward each other to compensate for the wear, and render the wheel true. Lateral motion of the guides is prevented by the abutments or guides *d*.

Similar adjustable bearings may be applied on opposite sides of needle-bars, and other shafts or rods having reciprocating or endwise motion, where a nice adjustment, with a rapid motion, is important.

Having described this invention, what I claim as new, and desire to secure by Letters Patent, is—

The slotted adjustable bearings D, diametrically in line with each other, on opposite sides of a journal or shaft, in combination with the parallel abutments or guides *d* and the clamp-screws K, substantially as specified.

In testimony that I claim the above I have hereunto subscribed my name in the presence of two witnesses.

LEVIN T. JONES.

Witnesses:
W. S. WILKINSON,
JAMES C. G. UNDUCT.